Figure 5:
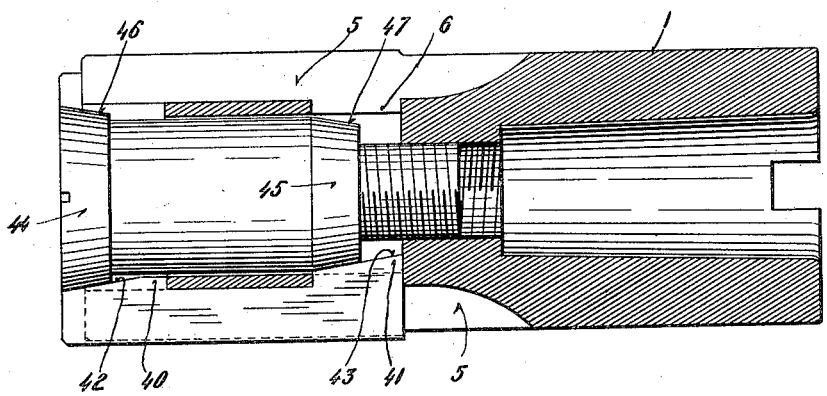

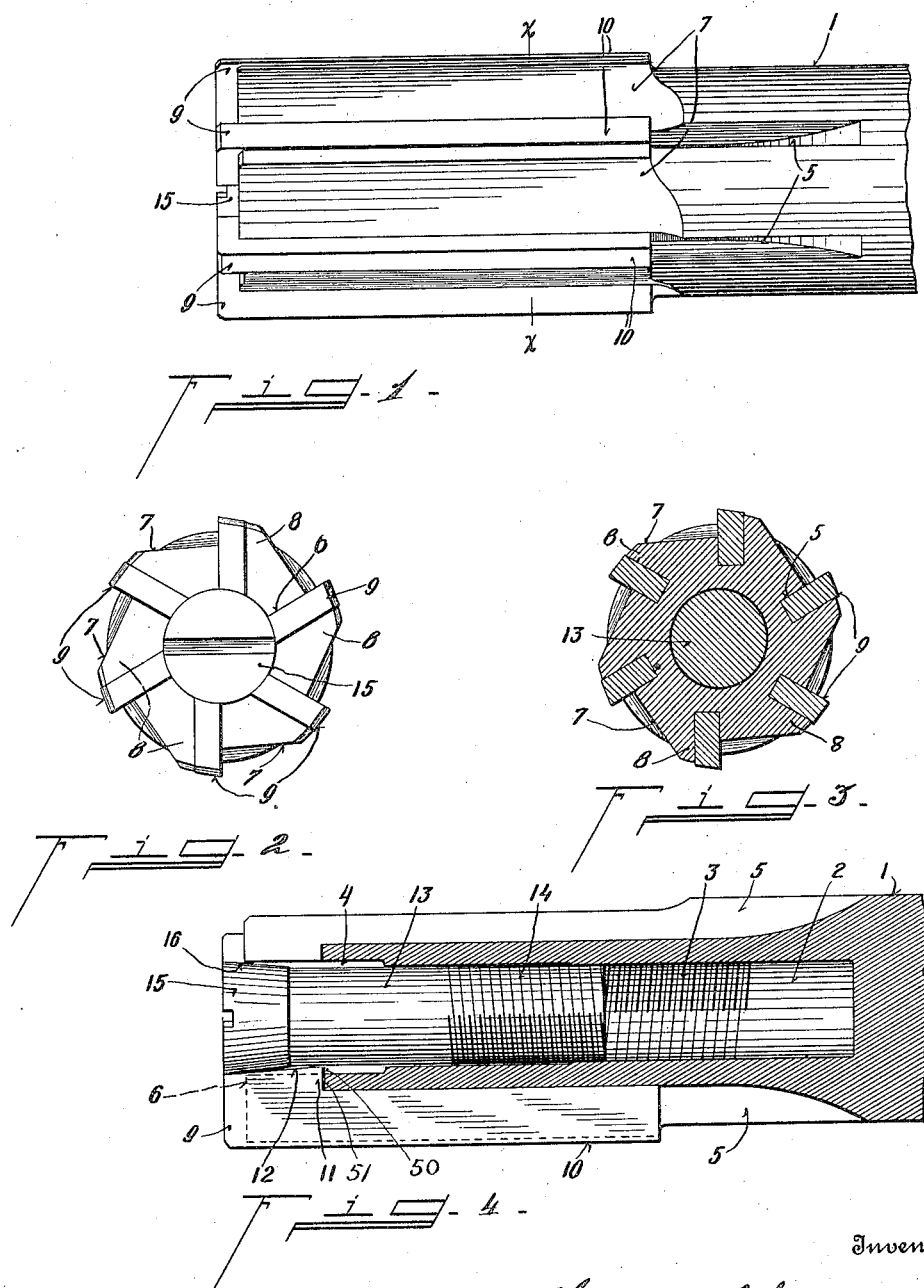

C. O. SCHELLENBACH.
EXPANSION REAMER.
APPLICATION FILED DEC. 20, 1912.

1,074,820.

Patented Oct. 7, 1913.
2 SHEETS—SHEET 2.

Witnesses
Inventor
Charles O. Schellenbach
By Wood Wood & Nathan
Attorneys

UNITED STATES PATENT OFFICE.

CHARLES O. SCHELLENBACH, OF CINCINNATI, OHIO.

EXPANSION-REAMER.

1,074,820.  Specification of Letters Patent.  Patented Oct. 7, 1913.

Application filed December 20, 1912. Serial No. 737,872.

*To all whom it may concern:*

Be it known that I, CHARLES O. SCHELLENBACH, a citizen of the United States, residing at Cincinnati, in the county of Hamilton and State of Ohio, have invented certain new and useful Improvements in Expansion-Reamers, of which the following is a specification.

My invention relates to an expansible reamer, of what may be termed the permanent or standard type, having provision for predetermined periodic expansion, periodic regrinding and reëxpansion.

One of the objects of the invention is to produce a compact, unitary, rigid reamer, with the blades constituting approximately fixed components of the body, but still susceptible of a considerable but circumferentially uniform precision expansion relative to the body.

Another object of the invention is to produce expansion means exerting pressure sufficient to overcome the friction-fit of the blades seated within the body and preferably exerting its maximum force approximately at one end of the reamer.

It is to be understood that the expansion provision is designed to compensate for wear of the blades and regrinding.

In practice the blades are set into the body, the diameter of the cutting circle being slightly in excess of the diameter of the desired cutting circle, the cutting blades being ground down to the requisite predetermined degree. As the blades wear, they are expanded and reground to the diameter of the predetermined cutting circle. The requisite expansion for one of these periodic operations may be as slight as three one-thousandths of an inch, or less, but the full expansion capacity in a small reamer may amount to three thirty-seconds of an inch, or even one-eighth of an inch in a larger reamer. Therefore, the device is of extreme durability, having substantially the advantages of an integral cutting tool combined with a wide range of expansive capacity compensating for the blade wear inherent in the usage of a tool of this character.

Of course, the invention is susceptible of various embodiments, for instance, it is immaterial whether the blade be seated in a body of solid shank-form with a centrally bored end or whether the body is hollow to constitute a shell reamer.

The features of the invention will be more fully described in the accompanying drawings, forming a part of this application, in which:—

Figure 1 is a side elevation of a shank-form of reamer. Fig. 2 is an end elevation. Fig. 3 is a section on line $x$—$x$ Fig. 1. Fig. 4 is a central longitudinal section. Fig. 5 is a central longitudinal section through a socket-form of reamer, showing a slight modification of blade and expander.

In Fig. 1, 1 represents the body formed with the central bore 2, provided with very fine screw threads 3, at its inner end. Preferably the diameter of the bore is enlarged at its forward end, as indicated by 4, Fig. 4. This is the shank-form of reamer. The shank exteriorly is also formed with a series of longitudinal radial grooves 5, terminating at their outer ends in slots 6, penetrating the walls of the outer end of the shank. This is shown in dotted lines, Fig. 4, and is also clearly disclosed by the comparative views, Figs. 2 and 3. The cutting end of the body has the conventional exterior configuration, the plane faces 7 serially throwing the cutting edges of the blades into relief, while the shoulders 8 form abutments for the rear faces of the blades, as shown in Fig. 3.

9 represents the blades, the rear ends 10 of which are respectively positioned in the grooves 5, while the forward ends having the inward extensions 11 positioned in the slots 6, the inner edges of the extensions 11 are formed with slightly inwardly tapering surfaces 12 within the body. The extensions 11 provide blade shoulders 50, which abut the body portions 51, defined by the inner terminals of slots 6, serving to longitudinally position the blades on the body.

13 represents the expander having the fine screw threads 14 at its inner end, engaging threads 3 of the body.

15 represents the screw head of the expander formed with the slightly inwardly tapering peripheral surface 16, the tapers 16 and 12 being approximately of the same degree.

The lateral dimensions of the blades relative to the grooves and slots are approximately the same, constituting what is known as a close, or "friction-fit," requiring a considerable circumferential pressure to seat the blades in the grooves and slots of the body.

When so fitted, the blades constitute approximately fixed components of the body. This necessitates the provision of an expander with capacity for exerting an outward or radial compression exerting its force at the forward ends of the blades, superior in degree to the fitting compression for seating the blades, and this superior compression is realized by the character of the fine pitch threads 3 and 14, coöperative with the wedging effect inherent from the engagement of the very slight taper surfaces 12, 16, respectively, of the blades and expander head.

It is to be understood that the requisite degree of blade expansion for this type of reamer for a given blade setting, is relatively very slight, in practice a given adjustment may not necessitate, say over three one-thousandths of an inch of expansion, but such expansion must be circumferentially uniform and of precision characteristic, whereas the full range of permissive expansion is quite considerable. As will be seen, in the preferred form, the individual blades are not bodily expanded equally but the maximum force is exerted at the forward or cutting edges of the blades in the coincident plane of the taper surfaces 12, 16. The turning of the expander exerts only a slightly preponderant compression relative to the friction-fit of the blades in the body so that while the blades are thus outwardly expressed, they still constitute approximately fixed components of the body, being still retained under the initial compression of friction-fit obtaining. The cutting edges of the blades may be reground without displacement and reëxpanded, as occasion requires.

In Fig. 5, I have shown a shell form of reamer, that is to say, the central bore extends entirely through the body. In this modification the slots 6 are formed at both ends of the grooves 5. The blade may have inward extensions 40, 41, at its opposite ends, formed with coincident tapers 42, 43. The expander is likewise formed with heads 44, 45, at its opposite ends provided with the coincident taper surfaces 46, 47, relatively contacting with the blade tapers 42, 43. When the expander is appropriately turned the force resultant from the taper contacts will be exerted equally at opposite ends of the blades, thus radially expanding the same bodily. It will thus be seen that the invention may be embodied in tools adapted to the varying classes of reamer work. For instance, in this view, I have shown the expander of hollow form, thus constituting a reamer of the shell type, adapted to be secured upon the intermediate portion of an arbor.

I do not wish to be limited to the details of construction or preferred embodiments of the invention, except as the specific phases of the invention are clearly indicated in the claims.

Having described my invention, I claim:—

1. A reamer comprising a bored body formed with an external longitudinal series of radial grooves forwardly terminating in slots penetrating the walls at the end of the body, the inner end of said body bore being formed with fine screw threads, blades having inward extensions at their forward ends, said blades being forcibly compressed into said grooves with a friction fit, the blade extensions extending entirely through the body slots, an expander formed with threads at its inner ends engaging the body threads and formed with a head having a slightly, inwardly tapering peripheral surface engaging the inner edges of the blade extensions within the body, the coöperative effect of the fine threads and taper pitch of the expander head, producing, when the expander is turned, an expanding pressure slightly in excess of the frictional hold of the blades within the shank.

2. A reamer body centrally bored and formed with external slots and grooves extending longitudinally of the body, a series of radial blades friction-fitted into the grooves with inward extensions penetrating entirely through the slots, an expander having screw threaded relations with the body, said expander and blades being formed with taper contact surfaces within the body, adapted to overcome the frictional hold and radially expand the blades in their seats.

3. A reamer body centrally bored and formed with external slots and grooves extending longitudinally of the body, a series of radial blades friction-fitted into the grooves with inward extensions penetrating entirely through the slots so as to definitely position the blades longitudinally in said grooves and slots, an expander having screw threaded relations with the body, said expander and blades being formed with taper contact surfaces within the body, adapted to overcome the frictional hold and radially expand the blades in their seats.

In testimony whereof, I have hereunto set my hand.

CHARLES O. SCHELLENBACH.

Witnesses:
OLIVER B. KAISER,
CLARENCE B. FOSTER.